United States Patent [19]

Tanaka

[11] Patent Number: 5,402,175
[45] Date of Patent: Mar. 28, 1995

[54] AUTOMATIC FOCUSING DEVICE WHEREIN LENS MOVEMENT IS CONTROLLED IN ACCORDANCE WITH LENS HUNTING

[75] Inventor: Taeko Tanaka, Yokohama, Japan

[73] Assignee: Canon Kabushiki Kaisha, Tokyo, Japan

[21] Appl. No.: 980,965

[22] Filed: Nov. 24, 1992

[30] Foreign Application Priority Data

Nov. 28, 1991 [JP] Japan .................. 3-337873

[51] Int. Cl.⁶ ............................................. H04N 5/232
[52] U.S. Cl. ...................................... 348/351; 348/356; 354/402
[58] Field of Search .................. 358/227, 209, 909; 354/402, 400; H04N 5/232; 348/345, 354, 356, 351

[56] References Cited

U.S. PATENT DOCUMENTS 4,473,743  9/1984  Ishikawa ................... 354/402 X
4,735,494  4/1988  Makino et al. .............. 358/227 X
5,005,086  4/1991  Iwamoto et al. ............. 358/227
5,212,516  5/1993  Yamada et al. .............. 354/402

OTHER PUBLICATIONS

"Automatic focusing of a television camera by means of a montaineering servo method," NHK Giho (technical bulletin), vol. 17, No. 1 (serial No. 86), 1965, pp. 21–37.

Primary Examiner—Michael T. Razavi
Assistant Examiner—Wendy R. Greening
Attorney, Agent, or Firm—Fitzpatrick, Cella, Harper & Scinto

[57] ABSTRACT

An automatic focusing device including a focus detection circuit for detecting a focus state, and a motor for driving a focusing lens in accordance with an output from the focus detection circuit. The device controls the driving state of the motor in accordance with a result of comparing the amplitude of hunting of the focusing lens with a predetermined value when the direction of the drive of the focusing lens is reversed.

21 Claims, 3 Drawing Sheets

FIG.3(a)

LEVEL OF DEPTH OF FIELD IW

F$_{NO}$ : STOP VALUE
f : FOCAL LENGTH

| F$_{NO}$ \ f | 1.4 ~2.0 | ~2.8 | ~4.0 | ~5.6 | ~8.0 | ~11 | ~ |
|---|---|---|---|---|---|---|---|
| 80~58mm | 0 | 0 | 1 | 1 | 2 | 2 | 3 |
| ~40 | 1 | 1 | 2 | 3 | 3 | 3 | 4 |
| ~28 | 2 | 2 | 3 | 3 | 4 | 4 | 5 |
| ~20 | 3 | 3 | 4 | 4 | 5 | 5 | 5 |
| ~14 | 4 | 4 | 5 | 5 | 6 | 6 | 6 |
| ~0 | 5 | 5 | 6 | 6 | 6 | 6 | 6 |

FIG.3(b)

LEVEL OF DEPTH OF FIELD IW

F$_{NO}$ : STOP VALUE
IW : DEPTH OF FIELD

| F$_{NO}$ | 1.4~2.0 | ~2.8 | ~4.0 | ~5.6 | ~8.0 | ~11 | ~ |
|---|---|---|---|---|---|---|---|
| IW | 1 | 1 | 2 | 2 | 3 | 3 | 4 |

FIG.3(c)

RELATIONSHIP BETWEEN IW LEVEL AND PULSE WIDTH D

IW : DEPTH OF FIELD
D : PULSE WIDTH

| F$_{NO}$ | 0 | 1 | 2 | 3 | 4 | 5 | 6 |
|---|---|---|---|---|---|---|---|
| IW | 10 | 15 | 20 | 25 | 30 | 35 | 40 |

AUTOMATIC FOCUSING DEVICE WHEREIN LENS MOVEMENT IS CONTROLLED IN ACCORDANCE WITH LENS HUNTING

BACKGROUND OF THE INVENTION

1. Field of the Invention

This invention relates to an automatic focusing device which is suitable for a video apparatus, such as a video camera, an electronic still-picture camera or the like.

2. Description of the Related Art

Recently, video apparatuses, such as video cameras, electronic still-picture cameras and the like, have developed remarkably. In particular, in order to improve the functions and operability of such an apparatus, functions, such as an automatic focusing (AF) device and the like, are usually provided in the apparatus.

For the automatic focusing device, a method has become adoped in which sharpness of a picture frame is detected from a picture signal obtained by performing photoelectric conversion of an image of an object using an image pickup device or the like, and a focusing operation is performed by controlling the position of a focusing lens so as to maximize the sharpness of the picture frame.

In general, the sharpness is evaluated, for example, from the intensity of the high-frequency component of the picture signal extracted by a band-pass filter (BPF), or the detected intensity of the width of a defocused portion of the picture signal (the width of an edge portion of the image of the object) extracted by a differentiating circuit or the like.

When an image of a normal object is photographed, the level of the high-frequency component is small and the width of a defocused portion increases in a defocused state. As the image approaches a focused state, the level of the high-frequency component increases and the width of the defocused portion decreases. In a completely focused state, the level of the high-frequency component has the maximum value, and the width of the defocused portion has the minimum value. Accordingly, the focusing lens is controlled so as to be driven at a highest speed in the direction of increasing the sharpness if the sharpness is low, be driven at a reduced speed as the sharpness increases, and be stopped when sharpness has been obtained with high accuracy.

Such an AF control method is called a "mountaineering automatic focusing method" (hereinafter termed a "mountaineering AF"). This method is described in detail in "Automatic focusing of a television camera by means of a mountaineering servo method", NHK Giho (technical bulletin) volume 17, number 1 (Ser. No. 86).

However, in the above-described automatic focusing device utilizing a picture signal, the automatic focusing capability of the device greatly depends on an object. In particular, speed control for the focusing lens near a focus point is difficult because if the driving speed of the focusing lens is reduced, much time is needed until the device reaches the focus point, thereby reducing the speed of the AF operation. If the driving speed of the focusing lens is too large, the device passes through the focus point and therefore cannot be stopped at the focus point, causing a possibility of producing hunting, i.e., oscillation back and forth along the optical axis, near the focus point. Accordingly, it has been desired to provide an AF system which can always perform a stable driving control operation of a focusing lens.

SUMMARY OF THE INVENTION

It is an object of the present invention to overcome the above-described problems in the prior art.

It is another object of the present invention to provide an automatic focusing device which can always perform a stable driving control operation of a focusing lens irrespective of the state of an object.

It is still another object of the present invention to provide an automatic focusing device, which can precisely discriminate and suppress hunting near a focus point, when the focusing lens of the device oscillates, by analyzing the oscillation without erroneously detecting the behavior of the focusing lens in a largely-defocused state, a low-contrast state or a high-brightness state as hunting near the focus point.

According to one aspect, the present invention, which achieves these objectives, relates to an automatic focusing device comprising focus detection means for detecting a focus state, driving means for driving a focusing lens in accordance with an output from the focus detection means, comparison means for comparing the amplitude of hunting of the focusing lens with a predetermined value when a direction of the driving of the focusing lens is reversed, and control means for controlling the driving of the driving means in accordance with a result of the comparison means.

It is still another object of the present invention to provide an automatic focusing device which can discriminate and suppress hunting produced near a focus point using the amplitude of an oscillation of a focusing lens, and perform a high-precision and stable automatic focusing operation irrespective of the depth of field, photographing environment and the like.

According to another aspect, the present invention, which achieves this objective, relates to a video camera comprising lens driving means for driving a photographing lens, comparison means for comparing an amplitude of hunting of the photographing lens with a predetermined value when the driving direction of the photographing lens is reversed, control means for controlling driving speed of the photographing lens by the driving means in accordance with a result of the comparison means, and means for changing the predetermined value in accordance with depth of field of the photographing lens.

According to still another aspect, the present invention relates to an automatic focusing device comprising focus detection means for detecting a focus state by extracting a focus signal changing in accordance with the focus state from a picture signal, a focusing motor for driving a focusing lens, in a lens system, in accordance with an output from the focus detection means, comparison means for comparing an amplitude of hunting, when the focusing lens oscillates back and forth in its moving direction, with a predetermined value, detection means for detecting the duration of the hunting, when the focusing lens moves back and forth in its moving direction, control means for controlling the drive speed of the focusing motor in accordance with outputs from the comparison means and the detection means, and means for correcting the predetermined value in accordance with the depth of field.

According to still another aspect, the present invention relates to an automatic focusing device comprising focus detection means for detecting a focus state, driving means for driving a focusing lens in accordance with an output from the focus detection means, determination means for determining characteristics of hunting of the focusing lens when the hunting of the focusing lens, in its moving direction, is detected, and control means for controlling the driving means in accordance with a result of the determination of the determination means.

These and other objects, advantages and features of the present invention will become more apparent from the following detailed description of the preferred embodiment taken in conjunction with the accompanying drawings.

BRIEF DESCRIPTION OF THE DRAWINGS

FIGS. 3(a) through 3(c) are diagrams showing data tables used in the control of the automatic focusing device of the present invention.

DETAILED DESCRIPTION OF THE PREFERRED EMBODIMENT

A description will now be provided of a case in which an automatic focusing device of the present invention is applied to a video camera with reference to the drawings.

Figure 1:
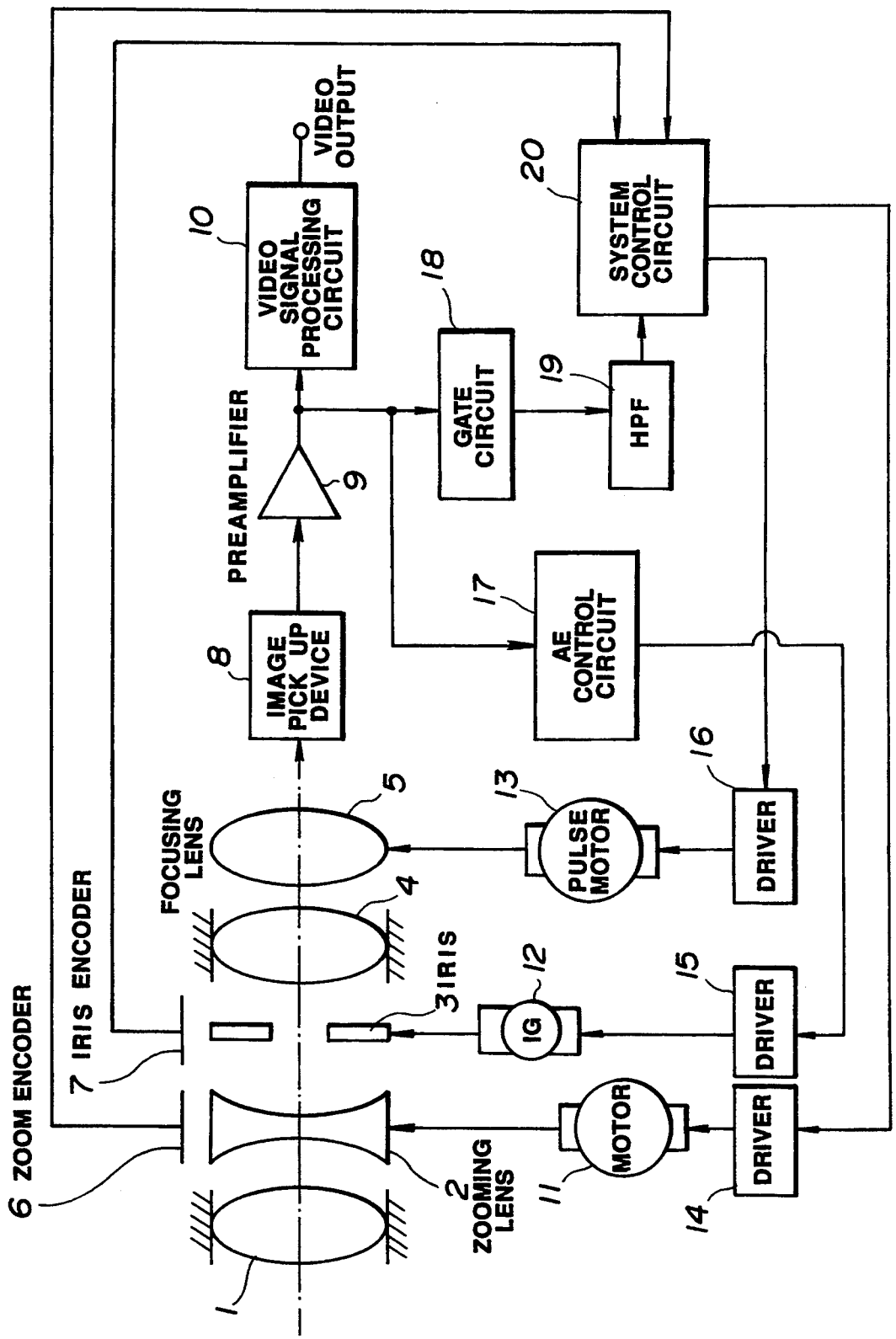
FIG. 1 is a block diagram showing a case in which an automatic focusing device of the present invention is applied to a video camera.

FIG. 1 is a block diagram showing a case in which an automatic focusing device of the present invention is applied to a video camera. In FIG. 1, there are shown a fixed front lens 1, serving as a first lens group, a varifocal zoom lens 2, serving as a second lens group, an iris 3 for adjusting the amount of incident light, a fixed lens 4, serving as a third lens group, and a focusing lens 5, serving as a fourth lens group.

By driving a motor 11 via a driver 14, the zoom lens 2 is moved along the optical axis to perform a zooming operation. By driving a pulse motor 13 via a driver 16, the focusing lens 5 is moved along the optical axis to perform a focusing operation. By driving an IG meter (iris galvanometer) 12 via a driver 15, the amount of aperture of the iris 3 is changed. The zoom lens 2 and the focusing lens 5 are controlled by commands from a system control circuit 20 (to be described later), and the iris 3 is controlled by an AE (automatic exposure) control circuit 17 (to be described later). The IG meter comprises a permanent magnet, and a coil rotatably disposed around the permanent magnet and connected to iris blades. The coil is rotated by an electromagnetic force generated by supplying current to the coil, whereby the iris blades are driven to change the stop value (the area of the aperture).

The moved position, that is, the focal length, of the zoom lens 2 is detected by a zoom encoder 6, and the amount of aperture of the iris 3 is detected by an iris encoder 7. Signals from the encoders 6 and 7 are supplied to the system control circuit 20 for use in the control of the focusing lens 5.

Incident light passing through a lens unit comprising the respective lenses and the iris 3 is imaged onto the image pickup surface of an image pickup device 8, such as a CCD (charge-coupled device) or the like, and is subjected to photoelectric conversion, whereby a picture signal is output. The picture signal output from the image pickup device 8 is amplified to a predetermined level by a preamplifier 9, and the amplified signal is supplied to a video signal processing circuit 10, where various kinds of signal processing, such as blanking processing, addition of a synchronizing signal, gamma correction and the like, are performed, whereby the signal is converted into a normalized television signal, which is output from a video output terminal. The television signal is supplied to an electronic viewfinder (not shown), a video cassette recorder or the like.

The picture signal output from the preamplifier 9 is also supplied to the AE control circuit 17, where the level of the average luminance signal in the picture signal is calculated, and the calculated level is compared with a predetermined reference level. An iris control signal for controlling the iris 3 is output so as to make the difference between the two levels 0, whereby the iris 3 is controlled via the driver 18 and the IG meter 12. Thus, the iris 3 is controlled so that the level of the average luminance signal always equals the above-described reference level.

The picture signal output from the preamplifier 9 is also supplied to a gate circuit 18, where only a signal corresponding to an image within a range frame, that is, a focus-detecting region, set within the photographing picture frame is extracted and supplied to a high-pass filter (HPF) 19. In the HPF 19, a high-frequency component whose level changes in accordance with a focus state is extracted, and is supplied to the system control circuit 20.

The system control circuit 20 controls the entire apparatus. As for the focus control operation, the system control circuit 20 detects a peak value in the level of the high-frequency component output from the HPF 19 during a one-field period for every field, calculates a change in the peak value, drives the focusing lens 5 in a direction to increase the peak value, determines a point where the peak value has the maximum value as a focus point, and stops the focusing lens 5 at that point. If the focusing lens 5 leaves the focus point, the system control circuit 20 starts the focusing lens 5 again so as to drive it to the focus point.

More specifically, when starting the focusing lens, hunting occurs, that is, the focusing lens is slightly oscillated back and forth along the optical axis. The direction in which the output level of the high-frequency component from the HPF 19 increases is made to be the direction of the drive of the focusing lens. After driving the focusing lens, the peak value in the level of the high-frequency component during a one-field period is taken in for every field, and the focusing lens is driven so as to maximize the peak value. That is, if the peak value during the one-field period increases for every field, the drive is continued in that direction. A decrease in the peak value indicates that the device has passed the desired focus point or the "summit of the mountain", as in the above-described "mountaineering AF". Hence, the direction of the drive is reversed, and the drive is stopped.

If the detection of the peak value in the level of the high-frequency component is continued even after the focusing lens has stopped at a focus point, and it is determined that the device has left the focus point because of a decrease in the level of the high-frequency component, the above-described direction discrimination is performed, and the focusing lens is driven again.

The system control circuit 20 calculates the depth of field using information relating to the focal length and the stop value detected by the zoom encoder 6 and the iris encoder 7, respectively. The calculated value is used for the drive control of the focusing lens.

That is, the sensitivity of the focusing lens changes in accordance with the depth of field, and therefore the driving amount of the focusing lens, for obtaining the amount of change of the same circle-of-confusion type system, differs. Hence, the process of correcting the driving amount and the driving speed of the focusing lens in accordance with the depth of field is performed.

Figure 2:
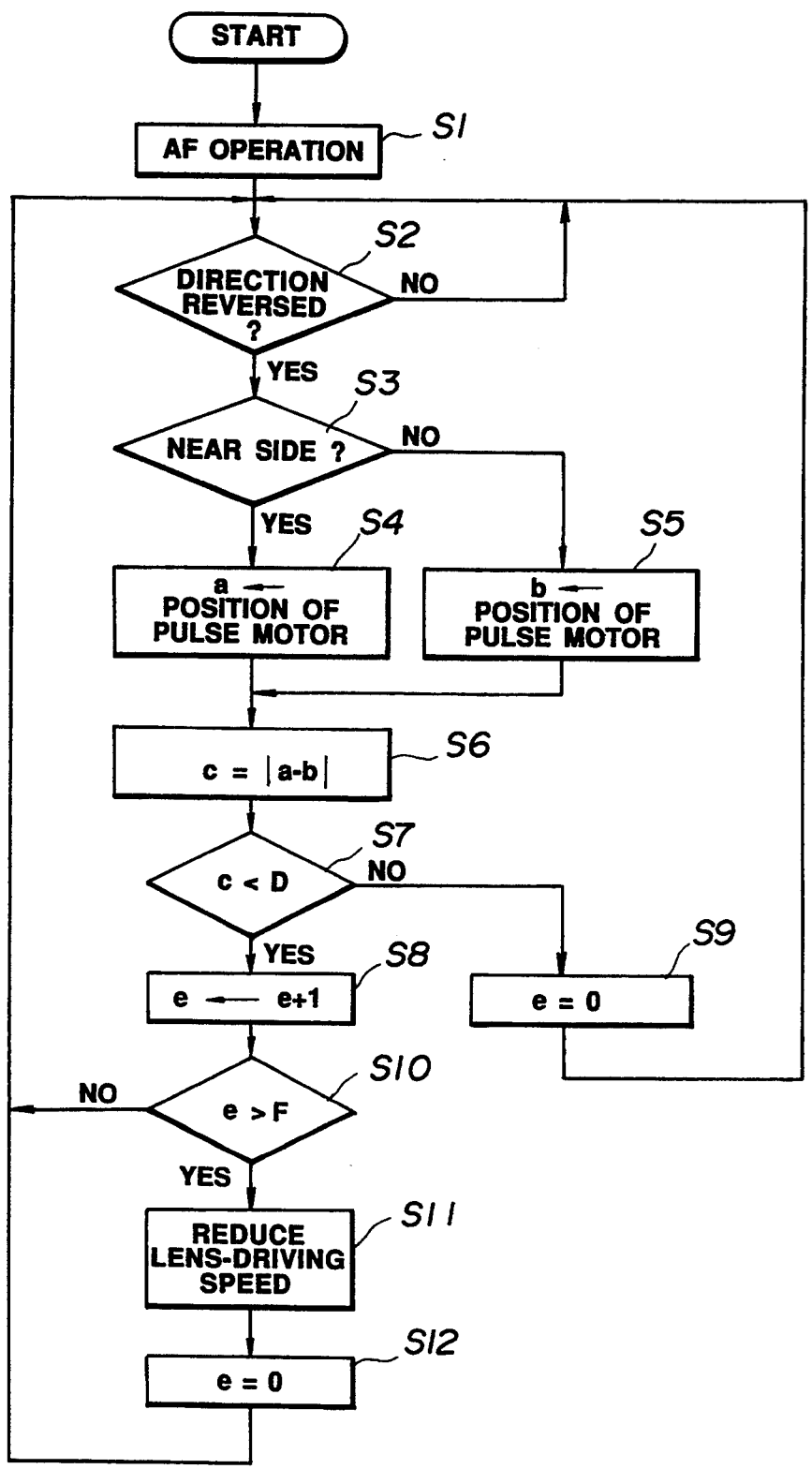
FIG. 2 is a flowchart illustrating the control operation of the automatic focusing device of the present invention.

FIG. 2 is flowchart showing the entire flow of the control operation performed by the system control circuit 20.

In FIG. 2, step S1 indicates the process of receiving the peak values in the level of the high-frequency component in the picture signal output from the HPF 19 shown in FIG. 1 for respective fields, detection information from the zoom encoder 6 and the iris encoder 7, and the like, calculating the above-described focusing-lens control information, and performing the "mountaineering AF" in accordance with the information.

In step S2, it is determined whether or not the level of the high-frequency component received in step S1 is smaller than the level in the preceding field, that is, the direction of the drive is reversed. If the result of the determination is negative, the process returns to step S1 to continue the normal AF control operation. If the result of the determination is affirmative, the process proceeds to step S3, where it is determined whether the direction of the reversal is at the near side or at the infinite side.

If the direction of the reversal is at the near side in step S3, the process proceeds to step S4, where the rotation position of the pulse motor 13 for driving the focusing lens at that time is stored in a variable "a". If the direction of the reversal is at the infinite side, the process proceeds to step S5, where the position of the pulse motor 13 at that time is stored in a variable "b". That is, every time the direction of the drive of the focusing lens is reversed, the rotation position of the pulse motor at the time of the reversal is stored in the variable corresponding to the direction of the drive.

In step S6, the difference between data stored in the variable "a" and data stored in the variable "b" is calculated, whereby the amount of rotation of the pulse motor from when the direction of the drive of the focusing lens is reversed to when the direction of the drive is reversed again, that is, the width c of the motor-driving pulse corresponding to the amount of rotation, is obtained. This pulse width corresponds to the amplitude of oscillation of the focusing lens.

In step S7, by referring to the data table in a memory, storing the depth of field IW and the pulse width D corresponding to the depth of field IW shown in FIG. 3(c), the pulse width c of the pulse motor obtained in step S6 is compared with the pulse width D predetermined in accordance with the depth of field at that time. If the pulse width c is smaller than the pulse width D, the process proceeds to step S8, where the value of a counter e, provided within the system control circuit 20, is incremented by one. If the pulse width c is at least equal to the pulse width D, the process proceeds to step S9, where the contents of the counter e are cleared. The process then returns to the normal AF control operation in step S1.

The reason why the amplitude of oscillation of the focusing lens is compared with the preset pulse width D will now be explained.

The main object of the present invention is to suppress hunting near the focus point of the focusing lens. Since hunting of the focusing lens occurs not only at the focus point, but also in a largely-defocused state or a low-contrast state, it is necessary to discriminate hunting at the focus point from hunting in other states, and to control this so that hunting near the focus point is suppressed, and so the speed of the focusing lens is not reduced in a largely-defocused state.

In the present invention, the amplitude of oscillation of the focusing lens is small in the case of hunting near the focus point. However, the amplitude is large in the case of hunting in a largely-defocused state since no undulation, that is, "mountain", is present in the level of the high-frequency component. Accordingly, the amplitude of oscillation of the focusing lens, that is, the pulse width c of the pulse motor for driving the focusing lens, is compared with the above-described pulse width D, and it is determined that if the amplitude is smaller than the pulse width D, the position of hunting is near the focus point, and that if the amplitude exceeds the pulse width D, the position of hunting is not near the focus point.

Accordingly, the pulse width D is set within a range where a pronounced defocused state is not provided even if the focusing lens moves near the focus point. Hence, it is possible to determine that the position of hunting is near the focus point if the amplitude of oscillation of the focusing lens is within such a range.

Since the amount of change of the defocused state, in accordance with the movement of the focusing lens, changes in accordance with the depth of field, the set value of the pulse width D is selected in accordance with the depth of field IW, as shown in FIG. 3(c).

FIG. 3(a) shows a data table for determining the depth of field IW from the focal length f and the stop value $F_{NO}$. The depth of field IW decreases as the focal length increases and the stop value shifts to the open side, and increases as the focal length decreases and the stop value becomes smaller. In the present embodiment, the value of the depth of field IW is represented in seven steps 0–6 in the sequence of increasing the value.

Based on the above-described values of the depth of field IW, the corresponding pulse width D, that is, the responding amplitude of oscillation of the focusing lens, is selected from the data table shown in FIG. 3(c), and the comparison processing in step S7 is performed.

The data table shown in FIG. 3(a) represents a general case in which the depth of field IW is determined from the focal length f and the stop value $F_{NO}$. In an inner-focusing-type lens, however, the depth of field IW is determined only from the stop value. In such a case, the value of the depth of field IW may be specified using a data table storing the relationship between the stop value $F_{NO}$ and the depth of field IW as shown in FIG. 3(b), and the pulse width D may be selected by referring to the data table shown in FIG. 3(c).

As described above, by comparing the amplitude of oscillation of the focusing lens, that is the pulse width c, with the pulse width D (the amplitude of oscillation of the focusing lens within a range where a pronounced defocused state is not provided) preset in accordance with the depth of field IW at that time, it is possible to discriminate hunting near the focus point from hunting in other states.

Referring again to the flowchart shown in FIG. 2, if the amplitude c of oscillation of the focusing lens is smaller than the predetermined pulse width D, that is, hunting is near the focus point, the process proceeds to step S8, where the value of the counter e is incremented by one. The process then proceeds to step S10, where the value of the counter e is compared with a value F indicating a certain constant time period. If the value of the counter e is equal to or smaller than the value F, the process returns to step S1, where the normal AF control operation is performed. If the value of the counter e is greater than the value F, the process proceeds to step S11, where the process of reducing the driving speed of the focusing lens by reducing the speed of the pulse motor for driving the focusing lens is performed. The process then proceeds to step S12, where the value of the counter e is cleared, and the process returns to step S1.

If it is determined in step S7 that the amplitude c of oscillation of the focusing lens is at least equal to the predetermined pulse width D, that is, the position of hunting is not near the focus point, then the value of the counter e is cleared in step S9, and the process returns to step S1, where the normal AF control operation is performed so that a searching operation is smoothly performed.

The reason why the value of the counter e is compared with the value F representing the predetermined time period will now be explained.

As described above, in the present embodiment, hunting near the focus point is discriminated according to the amplitude of oscillation of the focusing lens (the pulse width D). Actually, however, when a high-brightness object is photographed, a high level of the high-frequency component is obtained at the high-brightness portion. As a result, hunting having a small amplitude of oscillation is produced. However, since the position of such hunting is not at the focus point, the duration of the hunting is shorter than in the case of the focus point.

Accordingly, in the present embodiment, the duration of the hunting after the amplitude of oscillation of the focusing lens becomes less than the predetermined pulse width D in step S8 is measured by the counter e, and the counted value is compared with the predetermined time F in step S10, where it is discriminated whether the hunting is produced near the focus point or the hunting is caused, for example, by a high-brightness object.

If the value of the counter e is greater than the value F in step S10, it is determined that the hunting is produced near the focus point. Hence, in step S11, the hunting is suppressed by reducing the driving speed of the focusing lens. Subsequently, in step S12, the value of the counter e is cleared, and the process returns to step S1, where the normal AF control operation is performed, and the focus of the focusing lens is stopped at the focus point by the above-described AF control operation.

If the value of the counter e does not reach the value F, that is, the hunting is not produced near the focus point, in step S10, the process returns to step S1 without reducing the driving speed of the focusing lens. In step S1, the device is controlled so as to move the focus of the focusing lens to the focus point by the normal AF control operation.

As described above, according to the present invention, it is possible to discriminate hunting according to the amplitude of oscillation of the focusing lens, exactly discriminate hunting at the focus point from hunting in a largely-defocused state, a low-contrast state, a high-brightness state or the like, and suppress hunting at the focus point by reducing the speed of the focusing lens.

Furthermore, by changing the detection level of hunting in accordance with the depth of field, it is possible to perform an always exact and stable focus control operation irrespective of the photographing state.

Except as otherwise disclosed herein, the various components shown in outline or in block form in the figure are individually well known and their internal construction and operation are not critical either to the making or using of this invention or to a description of the best mode of the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An automatic focusing device, comprising:
   focus detection means for detecting a focus state;
   driving means for driving a focusing lens in accordance with an output from said focus detection means;
   comparison means for comparing a magnitude of hunting corresponding to a difference between two positions of the focusing lens with a predetermined value when a direction of the driving of the focusing lens is reversed; and
   control means for controlling the driving of said driving means in accordance with a result of said comparison means.

2. A device according to claim 1, wherein said comparison means comprises detection means for detecting the magnitude of the hunting of the focusing lens when the direction of the driving of the focusing lens is reversed.

3. A device according to claim 2, wherein said comparison means further comprises means for comparing the magnitude of the hunting of the focusing lens, detected by said detection means, with the predetermined value, and determination means for determining whether a state in which the magnitude of the hunting of the focusing lens is less than the predetermined value has continued for at least a predetermined time period, and wherein said control means reduces a speed of the focusing lens by controlling said driving means when said determination means determines that the state in which the magnitude of the hunting of the focusing lens is less than the predetermined value has continued for at least the predetermined time period.

4. A device according to claim 3, wherein said control means determines whether the hunting of the focusing lens is produced near an in-focus point or at a position far from the in-focus point, according to an output from said comparison means.

5. A device according to claim 3, wherein said control means determines whether the hunting of the focusing lens is produced near an in-focus point or is caused by a misoperation due to a high-brightness object according to an output from said determination means.

6. A device according to claim 1, further comprising image pickup means for converting an image of an object imaged onto an image pickup surface into a picture signal by performing photoelectric conversion of the image, and wherein said focus detection means determines the focus state by extracting a high-frequency component, which changes in accordance with the focus state from the picture signal.

7. A video camera, comprising:
lens driving means for driving a photographing lens;
comparison means for comparing a magnitude of hunting corresponding to a difference between two positions of the photographing lens with a predetermined value when a driving direction of the photographing lens is reversed;
control means for controlling driving speed of the photographing lens by said driving means in accordance with a result of said comparison means; and
changing means for changing the predetermined value in accordance with a depth of field of the photographing lens.

8. A video camera according to claim 7, wherein said changing means increases the predetermined value if the depth of field is great, and decreases the predetermined value if the depth of field is small.

9. A video camera according to claim 7, wherein the photographing lens comprises a focusing lens, and wherein said comparison means comprises detection means for detecting the magnitude of hunting of the photographing lens when the direction of the drive of the photographing lens is reversed.

10. A video camera according to claim 9, wherein said comparison means determines whether a condition in which the magnitude of hunting of the focusing lens, detected by said detection means, being less than a predetermined value has continued for at least a predetermined period of time, and wherein said control means reduces a speed of the focusing lens by controlling said driving means if a result of the determination is affirmative.

11. A video camera according to claim 10, wherein said comparison means determines whether the hunting of the focusing lens is produced near an in-focus point, is produced at a position far from the in-focus point, or is caused by a misoperation due to a high-brightness object.

12. A video camera according to claim 11, wherein said control means reduces the speed of the focusing lens only when the hunting of the focusing lens is produced near the in-focus point.

13. A video camera according to claim 11, wherein said changing means includes a memory storing a data table which defines a plurality of predetermined values corresponding to depths of field.

14. An automatic focusing device, comprising:
focus detection means for detecting a focus state by extracting from a picture signal a focus signal which changes in accordance with the focus state;
a focusing motor for driving a focusing lens, in a lens system, in accordance with an output from said focus detection means;
comparison means for comparing an magnitude of hunting corresponding to a difference between two positions of the focusing lens, when the focusing lens oscillates back and forth in its moving direction, with a predetermined value;
detection means for detecting the duration of the hunting when the focusing lens moves back and forth in its moving direction;
control means for controlling drive speed of said focusing motor in accordance with outputs from said comparison means and said detection means; and
correction means for correcting the predetermined value in accordance with depth of field of the focusing lens.

15. A device according to claim 14, wherein the focus signal comprises a high-frequency component in the picture signal.

16. A device according to claim 14, wherein said control means reduces the driving speed of said focusing motor when the magnitude of the hunting is smaller than the predetermined value, and a duration of the hunting equals at least a predetermined time period.

17. A device according to claim 14, wherein said correction means increases the predetermined value when the depth of field is great, and decreases the predetermined value when the depth of field is small.

18. A device according to claim 14, wherein said correction means comprises a memory storing a plurality of data of the predetermined value corresponding to changes in the depth of field.

19. An automatic focusing device, comprising:
focus detection means for detecting a focus state;
driving means for driving a focusing lens in accordance with an output from said focus detection means;
determination means for determining a magnitude of hunting of the focusing lens between two positions thereof when hunting of the focusing lens, in its moving direction, is detected; and
control means for controlling a speed of said driving means in accordance with a result of the determination by said determination means.

20. A device according to claim 19, wherein said determination means detects whether the hunting of the focusing lens is produced near an in-focus point, and wherein said control means reduces speed of the focusing lens when the hunting is produced near the in-focus point.

21. A device according to claim 19, wherein said determination means reduces a drive speed of the focusing lens when said determination means determines that the magnitude of the hunting of the focusing lens is smaller than a predetermined value, and that a state in which the magnitude of the hunting of the focusing lens is smaller than the predetermined value has continued for at least a predetermined time period.

* * * * *

UNITED STATES PATENT AND TRADEMARK OFFICE
CERTIFICATE OF CORRECTION

PATENT NO.    : 5,402,175
DATED         : March 28, 1995
INVENTOR(S)   : Tanaka, T.

It is certified that error appears in the above-indentified patent and that said Letters Patent is hereby corrected as shown below:

<u>Column 4</u>

Line 18, "driver 18" should read --driver 15--.

<u>Column 9</u>

Line 15, "driving" should read --a driving"--.

<u>Column 10</u>

Line 12, "drive" should read --a drive--; and
    Line 17, "depth" should read --a depth--.

Signed and Sealed this

Eleventh Day of July, 1995

Attest:

BRUCE LEHMAN

Attesting Officer      Commissioner of Patents and Trademarks